United States Patent

[11] 3,582,832

[72] Inventors Hans Erwin Junge;
Rolf Geibig, both of Backnang, Germany

[21] Appl. No. 877,533
[22] Filed Nov. 17, 1969
[45] Patented June 1, 1971
[73] Assignee Telefunken Patentverwertungsgesellschaft m. b. H.
Ulm Danube, Germany
[32] Priority Nov. 16, 1968
[33] Germany
[31] P 18 09 420.7

[54] AUTOMATICALLY CONTROLLED EQUALIZER UTILIZING A FIELD EFFECT TRANSISTOR

8 Claims, 2 Drawing Figs.

[52] U.S. Cl. 333/18, 307/295, 307/304, 330/145
[51] Int. Cl. H04b 3/06, H04b 3/10
[50] Field of Search 333/16, 18, 28, 28 A; 307/304; 330/35, 145; 179/170.8

[56] References Cited

UNITED STATES PATENTS

| | | | |
|---|---|---|---|
| 2,948,866 | 8/1960 | Oswald | 333/28(A) |
| 3,243,719 | 3/1966 | Scaroni, Jr. | 330/145X |

*Primary Examiner*—Herman Karl Saalbach
*Assistant Examiner*—Paul L. Gensler
*Attorney*—Spencer and Kaye

ABSTRACT: A rapidly variable equalizer circuit for automatically compensating for changes in the frequency dependent loss of transmission lines due to changes in temperature and environmental conditions includes a passive four-terminal control network having a second four-terminal network connected within it as part of a shunt resistance and a field effect transistor having its source-drain path connected to terminate the output of the second four-terminal network. The control voltage for this field effect transistor is derived from a signal transmitted over the line and having an assigned frequency by means of a peak voltage rectifier having an adjustable threshold level.

PATENTED JUN 1 1971

3,582,832

*Inventors.*
Hans Erwin Junge
Rolf Geibig
BY Spencer & Kaye
ATTORNEYS.

AUTOMATICALLY CONTROLLED EQUALIZER UTILIZING A FIELD EFFECT TRANSISTOR

BACKGROUND OF THE INVENTION

This invention relates to equalizing devices serving to compensate for changes in the attenuation characteristic of transmission lines, and more particularly to a device of this type which can rapidly compensate for changes caused by environmental conditions such as temperature, humidity, or frost.

Such equalizers must be easily, and desirably automatically, adjustable, and setting members are accordingly used. Mechanically operated setting members are moved either manually or moved automatically by mean of motors which are subject to wear and require maintenance. Accordingly, setting members without mechanically moved components are preferred.

The most commonly used setting members of the latter type utilize externally heated, temperature dependent resistors. These exhibit the drawbacks of a relatively narrow control range and high inertia and are therefore suited mainly for controlling smaller, slower, and seldom occurring changes in attenuation, such as those which occur in buried cable lines. Such devices are not particularly useful as equalizers for lines subjected to rapid and high amplitude changes in loss.

Accordingly, there exists a need for a rapidly variable equalizer having a wide control range for automatically compensating for changes in the frequency distortion of a transmission line caused by temperature and environmental conditions and not containing any mechanically moved components.

German Pat. Nos. 1,255,143 and 1,269,677 owned by the assignee of the present application, disclose control networks which are useful for similar equalizing purposes. These networks can be adjusted to produce the desired attenuation curve, which is inverse to the curve $a=F[f]$ of the line, where $a$ is the attenuation and $f$ is the frequency, over a wide frequency range and a large control range by use of a setting member which consists of a controllable resistor whose resistance is not frequency dependent. The selection of a suitable setting member in conjunction with the above-mentioned control network is limited in that these control networks furnish the desired curve path over a large control range only when there is no load. Thus, considering the finite input resistance of subsequently connected structural components, the characteristic impedance of the equalizing device, and thus the lowest settable resistance of the setting member, must be very small.

SUMMARY OF THE INVENTION

Among the objects of the present invention is the provision of an equalizing device for rapidly compensating changes in the frequency dependent attenuation of transmission lines caused by temperature and environment-produced changes.

Briefly stated these and other objects of the invention are achieved by providing a passive four-terminal control network which includes at least one series resistance on its input side and a shunt resistance formed of a resistor and the input impedance of a reflection free second four-terminal network in series. A field effect transistor has its source-drain path connected to terminate this second four-terminal network and serves as an adjustable ohmic resistor. The field effect transistor is controlled via its gate by a DC control voltage derived from the assigned frequency of a transmitted signal which is tapped behind the output of the control network by means of a peak rectifier with an adjustable conduction threshold.

The term "assigned frequency" designates any signal emitted by a transmitter at a constant amplitude level and transmitted over the line to be controlled and used to control the equalizing device. It may be a control pilot frequency transmitted in addition to data, or a pilot signal frequency transmitted for other purposes such as a synchronizing pilot signal, or another oscillation transmitted at a constant level but, for example, frequency modulated.

DESCRIPTION OF THE PREFERRED EMBODIMENTS

Figures 1, 2:
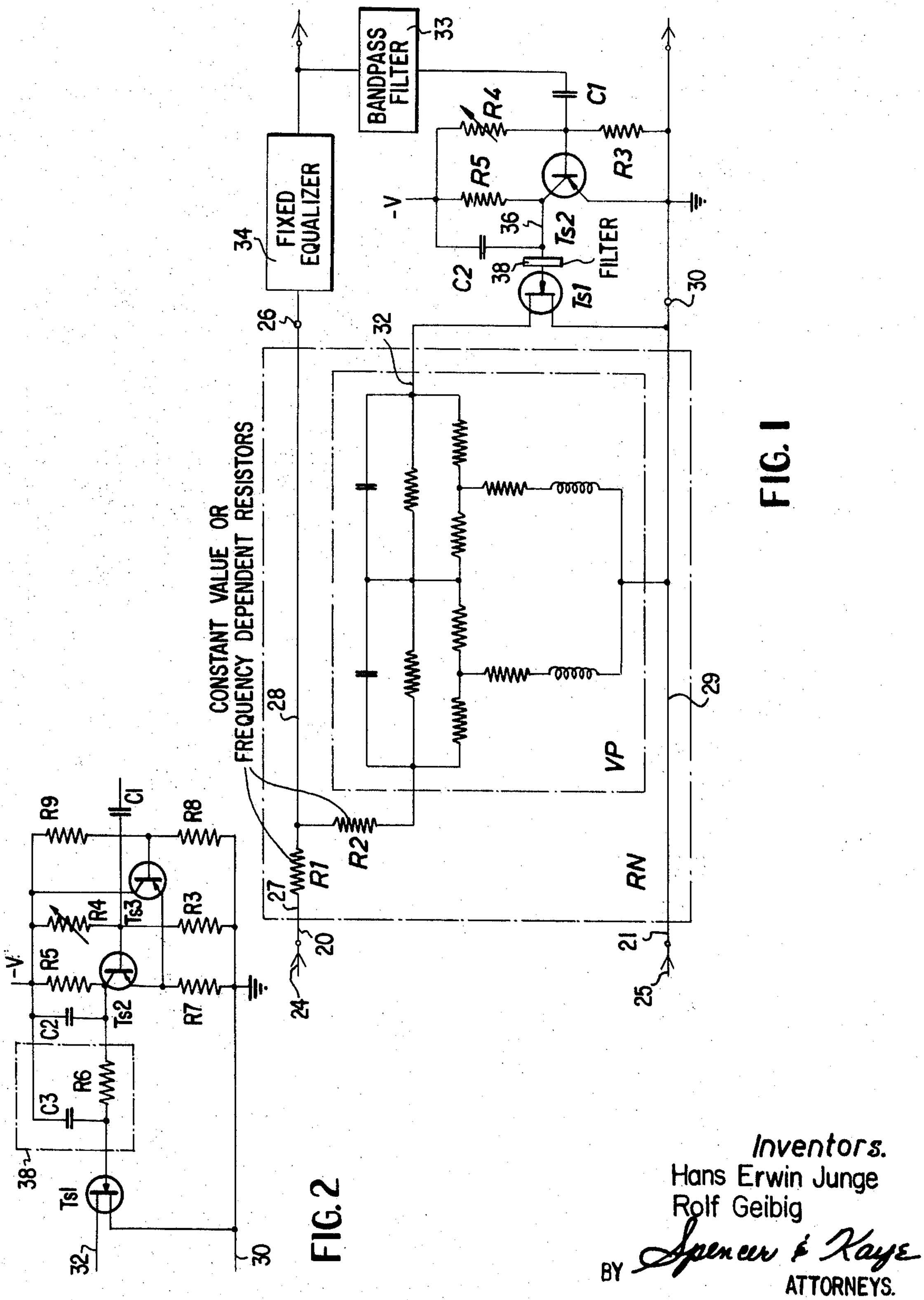
FIG. 1 is a schematic view showing a circuit according to the present invention.
FIG. 2 shows a control device for an equalizer similar in principle to that of FIG. 1, but completed by useful subdevices, i.e. a smoothing filter for the DC control voltage and a temperature compensating circuit.

Referring now to FIG. 1, a rapidly variable equalizer circuit according to the present invention includes a passive four-terminal control network RN which has a pair of inputs 20, 21 connected to the two conductors 24 and 25, respectively, of a transmission line carrying an AC frequency signal which is to be controlled. Control network RN is in general similar to the networks disclosed in the above-mentioned German Pats. DBP 1,255,143 and DBP 1,269,667. Control network RN includes a series resistance R1 connected in series between input 20 and an output 26 of the control network via lines 27 and 28, respectively. In addition, it includes a shunt resistance R2 and a second four-terminal network VP which are connected in series between line 28 and a line 29 which connects the second input 21 to the second output 30 of control network RN.

That portion of the control network RN which is shown within dotted lines in FIG. 1 is in general similar to the corresponding networks disclosed in German Pats. DBP 1,255,143 and DBP 1,269,667. The preferably employed networks differ from one another in that according to DBP 1,255,143 the series resistor R1 and the shunt resistor R2 are ohmic resistors, that is resistors whose resistance in ohms does not depend upon the frequency carried by them so that the equalizing device can control only the deviation from an average attenuation curve and therefore are supplemented by a fixed equalizer to compensate the median attenuation curve of the line, while in the network according to DBP 1,269,667, the series resistance R1 and the shunt resistor R2 are frequency-dependent resistors, preferably damped resonant circuits, and there is an additional frequency dependent series resistor provided on the output side which is preferably also a damped resonant circuit. In the control network according to the latter patent an additional fixed equalizer is not needed.

The peak rectifier with conduction threshold furnishes a DC voltage as a function of the output level of the received assigned frequency, which function is of such a type that the relative changes of the DC voltage are greater than the relative changes of the level of the received assigned frequency. Such a control voltage is advantageous for continually adjustable setting members. The adjustable threshold voltage is equal to the nominal voltage of the assigned frequency and is compared in the control device with the actual voltage of the received assigned frequency.

According to the present invention the second four-terminal network VP has connected thereto a field effect transistor Ts1 whose source-drain path is connected between output 30 and an output 32 of network VP. In order to achieve the objects of the present invention, field effect transistor Ts1 should be of a type whose source-drain resistance can be adjusted down to very low values. Suitable field effect transistors are commercially available, e.g. components designated with 2 N 4445 thru 2 N 4448, manufactured by Crystalonics, Cambridge, Mass.

The gate of field effect transistor Ts1 is connected to the collector of a second transistor Ts2. The emitter of transistor Ts2 is connected to the output 30 of control network RN and to ground. The base of transistor Ts2 is connected to the output 26 of the control network RN through a capacitor $C_1$, a band-pass filter 33, and a fixed equalizer 34 in order to tap off the assigned frequency. If desired, other circuit elements such as amplifiers could also be connected between the base of Ts2 and the control network output 26. Band-pass filter 33 serves the purpose of blocking frequencies other than the assigned frequency appearing at the network output. Capacitor $C_1$ is provided only for the purpose of preventing overloads in the voltage divider hereafter described.

The fixed equalizer 34 for the compensation of the median attenuation curve of the line consists in a network with inductors, capacitors and resistors, usually in form of a so-called bridged T filter. Examples for such equalizers are given by J. F. Bell in:

"An approach to the design of constant-resistance amplitude equalizer networks" published in Proc. IEE, Vol. 105, Part B Mar. 1958, pages 185 to 189.

Also connected to the base of Ts2 is a voltage divider including a fixed resistor R3 connected between the base and ground and an adjustable resistor R4 connected between the base and a fixed voltage source −V. As a result of its connection to both the voltage divider and the assigned frequency filter there appears at the base of transistor Ts2 a direct voltage from the voltage source −V with a superimposed alternating voltage. The blocking effect of the transistor Ts2 is thus augmented during one-half of each cycle of the superimposed alternating voltage and is decreased during the other one-half cycle. During the peaks of higher amplitude values of the assigned frequency the transistor Ts2 is controlled so as to be conductive.

A load resistor R5 is connected in series between the voltage source −V and a line which is common to both the gate of the field effect transistor Ts1 and the collector of the second transistor Ts2. A capacitor $C_2$ bridges load resistor R5. The voltage drop across load resistor R5 during peaks of higher amplitude values when transistor Ts2 is conductive charges the capacitor $C_2$. This capacitor partially discharges through resistor R5 in the intervals between successive voltage peaks. Transistor Ts2, in conjunction with the resistors and capacitors connected thereto, thus acts as a peak rectifier.

The voltage at the collector of transistor Ts2, corresponding to the difference between the constant supply voltage −V and the voltage across capacitor $C_2$, is fed to the gate of the field effect transistor Ts1 and controls the value of its source-drain path resistance.

Due to the very high response speed of the setting member Ts1 of the arrangement according to the present invention the direct control voltage must be substantially free of superimposed alternating voltages. This is accomplished by a suitable selection of the time constant of the parallel connection consisting of the load resistance R5 and the capacitor $C_2$. In addition, a smoothing low pass filter 38 can be inserted in line 36 between the collector of Ts2 and the gate of Ts1. The low pass filter 38 may consist of one or more sections, each of which containing a series resistor R6 or a coil and a shunting capacitor $C_3$ as shown with one section in FIG. 2. The number of sections depends from the used assigned frequency. With a very low assigned frequency two or even three sections may be necessary, with a higher assigned frequency one section may be sufficient and with a very high assigned frequency the smoothing effect will be obtained by the capacitor $C_2$ in connection with the resistor R5 so as no additional low pass filter is required.

Transistor Ts2 operates under unusual operating conditions in the rectifier circuit as well as in a usually nonutilized characteristic range and with unusually low currents. The circuit is therefore temperature dependent to a very large degree and can not be temperature compensated by the diodes usually employed for this purpose. The unusual operating conditions of the transistor Ts2 result from other conditions given to the RC-section formed by the resistor R5 and the capacitor $C_2$. On the one side the time constant of the RC-section should be high, so that the obtained DC control voltage has but a small ripple, on the other side the capacitor $C_2$ should be small for constructive reasons. This implies a high resistance of the resistor R5. The current through the transistor Ts2 is then low if the transistor is controlled to relatively low ohmic values as well as if it is blocked, i.e. controlled to high ohmic values essentially determined by the resistance of the resistor R5. The current through the transistor Ts2 is of the order several microamperes and the ratio between the lowest and the highest currents is about 1:3. The variations of the current through the transistor caused by changes of the temperature in the normally required range and with a constant control voltage for the transistor are of the same order of magnitude, so that changes in temperature have a considerable influence on the control voltage for the field effect transistor Ts1. If a reliable operation of the equalizer in a wide range of temperatures is required, it will be necessary to compensate the control circuit for temperature influences.

A suitable temperature correction could be effected by a known arrangement in which a current flows through a further transistor having a fixed base voltage divider connected to it. The current flowing through this further transistor is substantially dependent on temperature and produces a voltage drop which changes with temperature across an emitter resistor common to both transistors. Such an arrangement has proven to be suitable for temperature compensation in the rectifier circuit.

FIG. 2 shows at its right side the arrangement of the rectifier transistor Ts2 and the temperature compensating transistor Ts3, both of the same type and coupled by the common emitter resistor R7. The base voltage of the transistor Ts3 is fixed by the tap of the voltage divider R8 and R9 and the current through the transistor Ts3 is dependent solely on the temperature. The voltage drop caused by this current over the emitter resistor R7 compensates for the temperature drift of the transistor Ts2.

The rectifying transistor Ts2 as well as the temperature compensating transistor Ts3 should be of a low noise type, e.g. the type 2 N 3963, manufactured by SGS-Fairchild, USA.

The temperature dependence of the field effect transistor Ts1 is automatically compensated by the control circuit, as temperature dependent changes in the characteristics of the field effect transistor result in changes of the transmission characteristics of the equalizer, which are considered by the control device as well as changes of the transmission characteristics of the line. Differences in the characteristic curves of individual field effect transistors can be compensated by a change in the setting of the base voltage divider of transistor Ts2 in the rectifier circuit.

It will be understood that the above description of the present invention is susceptible to various modifications, changes and adaptations, and the same are intended to be comprehended within the meaning and range of equivalents of the appended claims.

We claim:

1. A rapidly variable equalizer circuit with a wide control range for automatically compensating changes in the frequency dependent loss of transmission lines resulting from changes in the temperature and environmental conditions, comprising, in combination:

a. a passive four-terminal control network including:
   1. a pair of input means for connecting said passive four-terminal network to a transmission line carrying an assigned frequency signal,
   2. a series resistance connected to the input side of said control network,
   3. a shunt resistor connected within said control network,
   4. a second four-terminal reflection free network connected in series with said shunt resistor and within said control network, said shunt resistor and said second network together constituting a shunt resistance within said control network having an impedance equal to the sum of that of said shunt-resistor and of the input impedance of said second four-terminal network; and
   5. a field effect transistor having its source-drain path connected to terminate said second four-terminal network and serving as an adjustable ohmic resistance; and b. means at the output of said control network for adjusting the source-drain resistance of said field effect transistor in response to the value of the assigned frequency signal appearing at said output and including:

1. peak rectifier means having an actuation threshold and producing a DC control voltage,
2. adjustable means for controlling the value of said actuation threshold, and
3. means for applying said DC control voltage to the gate of said field effect transistor.

2. The combination defined in claim 1 further comprising filter means connected between said peak rectifier means and said field effect transistor.

3. The combination of claim 1 wherein said series resistance and said shunt resistance are ohmic resistors, and further comprising fixed equalizer means connected to said control network for compensating the median attenuation curve of the transmission line.

4. The combination defined in claim 1 wherein said series resistance and said shunt resistance are each ohmic resistors, and further comprising fixed equalizing means connected to said control network.

5. The combination defined in claim 1 wherein said series resistance and said shunt resistance are frequency dependent resistors.

6. The combination defined in claim 5 wherein said frequency dependent resistors are damped resonating circuits.

7. The combination defined in claim 1 wherein said adjustable means comprise a constant voltage source and voltage divider means connected to said voltage source for supplying a selected portion of the voltage from said source, and said peak rectifier comprises a second transistor, means for applying said assigned frequency signal to the base of said second transistor, means for applying the voltage output of said divider means as a bias to said second transistor, a resistor connecting said voltage source to the collector of said second transistor, capacitor means bridging said resistor, and means for applying the DC voltage at said capacitor to the gate of said field effect transistor.

8. The combination defined in claim 7 further comprising:

a. a third transistor;
b. voltage divider means connected to the base of said third transistor; and
c. means for producing a temperature dependent voltage drop in the current flowing through said third transistor including a resistor connected in series with the emitter of said second and said third transistors.